US009083575B2

(12) United States Patent
Hollis

(10) Patent No.: US 9,083,575 B2
(45) Date of Patent: Jul. 14, 2015

(54) DEVICES HAVING DIFFERENT EFFECTIVE SERIES RESISTANCE STATES AND METHODS FOR CONTROLLING SUCH DEVICES

(75) Inventor: Timothy Hollis, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 921 days.

(21) Appl. No.: 13/072,402

(22) Filed: Mar. 25, 2011

(65) Prior Publication Data
US 2012/0242157 A1 Sep. 27, 2012

(51) Int. Cl.
H04L 25/02 (2006.01)

(52) U.S. Cl.
CPC .................. H04L 25/0278 (2013.01)

(58) Field of Classification Search
CPC .... H01F 38/10; H01F 2038/143; H02J 17/00; H04B 3/56; H02M 3/07; H03H 7/38; H03K 3/53; H03K 3/537; G01R 15/14; H04L 25/0278
USPC .................................... 307/149, 99
See application file for complete search history.

(56) References Cited

U.S. PATENT DOCUMENTS

| 2,451,859 | A  * | 10/1948 | Mumma et al. | 340/12.15 |
| 6,535,075 | B2 * | 3/2003  | Frech et al. | 333/17.1  |
| 6,574,288 | B1 * | 6/2003  | Welland et al. | 375/327 |
| 6,700,794 | B2   | 3/2004  | Vinson et al. |           |
| 6,707,403 | B1 * | 3/2004  | Hurrell | 341/120         |
| 6,949,967 | B2 * | 9/2005  | Wang et al. | 327/337     |
| 7,298,599 | B1   | 11/2007 | Vashchenko et al. |       |
| 7,701,277 | B2 * | 4/2010  | Toffolon et al. | 327/310 |
| 8,053,934 | B2 * | 11/2011 | Nakashima | 307/115       |
| 2002/0190887 | A1 * | 12/2002 | Takata et al. | 341/172 |
| 2004/0229660 | A1 * | 11/2004 | Liu et al. | 455/574 |
| 2005/0068014 | A1 | 3/2005 | Dillon et al. | |
| 2005/0122755 | A1 * | 6/2005 | Tsutsumi et al. | 365/51 |
| 2007/0228840 | A1 | 10/2007 | Vikinski et al. | |
| 2009/0021332 | A1 * | 1/2009 | Brekelmans et al. | 334/55 |
| 2009/0096516 | A1 | 4/2009 | Nakashima | |
| 2009/0153239 | A1 | 6/2009 | Toffolon et al. | |
| 2009/0243754 | A1 | 10/2009 | Conta et al. | |
| 2010/0085132 | A1 | 4/2010 | Cheng et al. | |

(Continued)

FOREIGN PATENT DOCUMENTS

| WO | WO-2006038190 A1 | 4/2006 |
| WO | WO-2012135051 A2 | 10/2012 |
| WO | WO-2012135051 A3 | 10/2012 |

OTHER PUBLICATIONS

QuadTech, Equivalent Series Resistance (ESR) of Capacitors, QuadTech, Incorporated, Jul. 2003, (1-4).*

(Continued)

Primary Examiner — Rexford Barnie
Assistant Examiner — Elim Ortiz
(74) Attorney, Agent, or Firm — Schwegman Lundberg & Woessner, P.A.

(57) ABSTRACT

Devices and methods are described, such as those including parallel paths coupled between a first power supply and a second power supply. The parallel paths include different values of capacitance to reduce unwanted variations as a function of current demand frequency such as resonance. A selectable resistance is provided along one or more parallel paths, and can be varied during different times in a signal burst.

11 Claims, 3 Drawing Sheets

(56) References Cited

U.S. PATENT DOCUMENTS

2011/0001530 A1* 1/2011 Nishi et al. .................... 327/162
2011/0227666 A1* 9/2011 Manssen et al. ................ 333/32
2012/0044028 A1 2/2012 Hollis et al.

OTHER PUBLICATIONS

"International Application Serial No. PCT/US2012/030411, International Preliminary Report on Patentability mailed Oct. 10, 2013", 6 pgs.
"International Application Serial No. PCT/US2012/030411, Search Report mailed Sep. 27, 2012", 3 pgs.
"International Application Serial No. PCT/US2012/030411, Written Opinion mailed Sep. 27, 2012", 4 pgs.
"European Application Serial No. 12764355.9, Extended European Search Report mailed Aug. 6, 2014", 13 pgs.
"European Application Serial No. 12764355.9, Office Action mailed Nov. 26, 2013", 3 pgs.
"European Application Serial No. 12764355.9, Response filed May 27, 2014 to Office Action mailed Nov. 26, 2013", 13 pgs.
Hegarty, Timothy, "Paralleling Electrolytic and Ceramic Capacitors Perks Up POL Transient Response", (Mar. 1, 2011), 1-11.

* cited by examiner

DEVICES HAVING DIFFERENT EFFECTIVE SERIES RESISTANCE STATES AND METHODS FOR CONTROLLING SUCH DEVICES

On-die decoupling capacitance and its associated resistance are tools for taming the characteristics of the power delivery distribution network. By selecting the resistive-capacitive combination in the power delivery system, a resonance of the system impedance can be pushed down to lower frequencies and/or pushed down in magnitude. However, introducing effective series resistance (ESR) may place a constraint on high frequency characteristics of the power delivery impedance.

DETAILED DESCRIPTION

In the following detailed description of the invention, reference is made to the accompanying drawings that form a part hereof and in which are shown, by way of illustration, specific embodiments in which the invention may be practiced. These embodiments are described in sufficient detail to enable those skilled in the art to practice the invention. Other embodiments may be utilized and material, structural, logical, electrical changes, etc. may be made.

When selecting a resistive-capacitive combination in the power delivery system, a static choice of ESR in a decoupling system has some drawbacks. Choosing a high ESR can provide a benefit in suppressing unwanted resonance. however, at high frequencies, the high ESR can exaggerate an unwanted dip in power due to slew rate.

Figure 1:
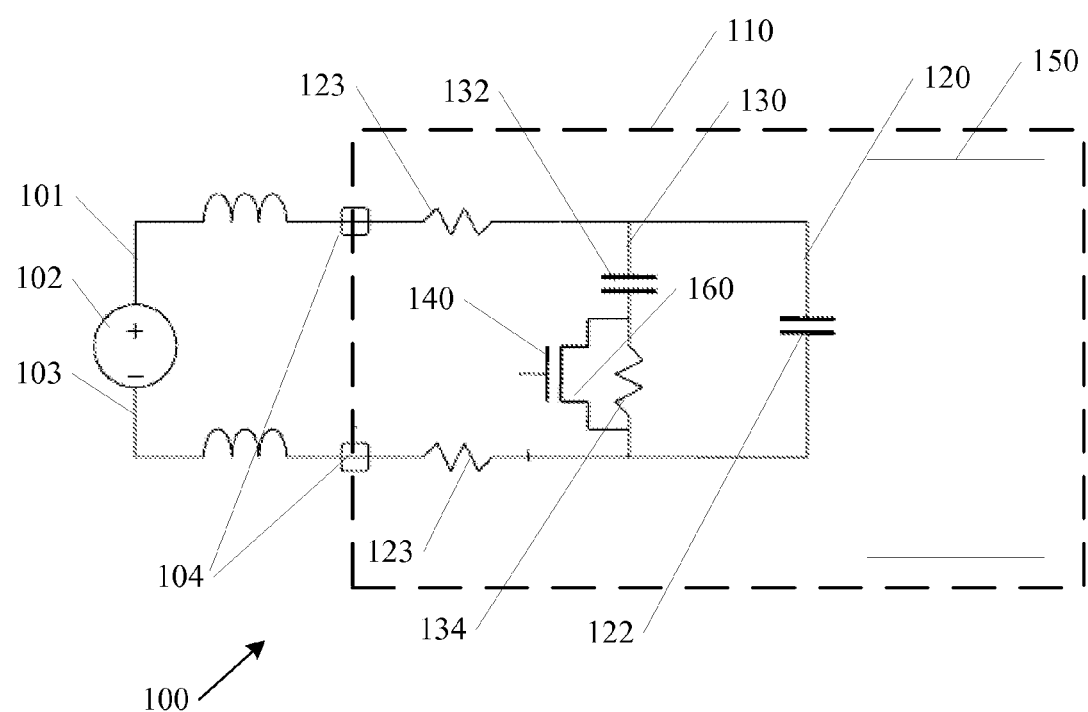
FIG. 1 shows a schematic of a device including a power system according to an embodiment of the invention.

FIG. 1 shows a schematic of a device 100 including a power system according to an embodiment of the invention. A power source 102 is shown coupled to a die 110. In the example shown, the power source is connected to the die 110 at pads 104. The power source 102 is shown as a DC power source, and can be described as having a first power supply 101 and a second power supply 103. Although the first power supply 101 and the second power supply 103 are shown coupled together at the power source 102 in the Figure, other examples include a Vcc line as the first power supply 101, and a ground line as the second power supply 103.

A first pathway 120 is shown coupled between the first power supply 101 and the second power supply 103. The first pathway 120 includes a first capacitance, as illustrated symbolically by capacitor 122. In one example, a value of the first capacitance is approximately 50 pF. In one example the first pathway 120 includes a first ESR. In one example the first ESR is a low ESR, and consists primarily of resistance in the conduction lines. In one example no additional ESR is intentionally added to the first pathway 120.

A second pathway 130 is also shown coupled between the first power supply 101 and the second power supply 103 in FIG. 1. The second pathway 130 includes a second capacitance, as illustrated symbolically by capacitor 132. In one example, the second capacitance is higher than the first capacitance. In one example, the second capacitance is approximately four times higher than the first capacitance. In one example, the second capacitance is approximately 200 pF and the first capacitance is approximately 50 pF.

In one embodiment, both the first pathway 120 and the second pathway 130 are shown located on the die 110. By locating the first pathway 120 and the second pathway 130 in close proximity to the electronic components 150 being powered, the circuit can be more effective at providing a consistent power supply, with reduced resonance, and good high frequency performance.

In one example, the second pathway 130 includes a second ESR, as illustrated symbolically by resistor 134. In one example, the second ESR is higher than the first ESR. In one example, the second ESR is approximately 6 ohms. In operation, the first pathway 120 provides a low resistance pathway to improve power supply operation at high frequencies as the capacitor 122 is able to respond more quickly to the instantaneous current demands of electronic components 150. At the same time, the second pathway 130 provides an effective amount of resistance to dampen unwanted resonance effects at lower frequencies.

FIG. 1 also shows a circuit 140 to activate a low resistance state in the second pathway 130. In one example, the circuit 140 comprises a transistor (e.g. a passgate) having a resistance associated with passing a signal through the transistor. In one example, the transistor comprises an NMOS passgate. In one example, the resistance associated with passing a signal through the transistor is approximately 2 ohms. In operation, if the circuit 140 is activated, the ESR along the second pathway 130 drops from a high resistance state to a low resistance state. In one example, where the ESR of resistor 134 is 6 ohms, when the circuit 140 is activated, the ESR along the second pathway 130 drops from 6 ohms to 1.5 ohms.

At a beginning of an electronic signal burst, a high resistance in the second pathway 130 may cause an unwanted dip in power. In one example operation, at a beginning of an electronic signal burst, the circuit 140 is activated, and reduces an ESR for a period of time at the beginning of the electronic signal burst. The reduction in ESR reduces or eliminates the unwanted dip in power. After the beginning of the electronic signal burst, the circuit 140 is deactivated, and the second pathway 130 returns to a high ESR state. The high ESR state now provides a desired damping effect to reduce unwanted resonance for a remainder of the electronic signal burst.

In one example, the circuit 140 may remain in the low ESR state by default, and be activated to the high ESR state as desired. In one example, the circuit 140 may be switched to a low ESR state following a previous burst, to be ready for the next burst, and be switched to a high ESR state after the beginning of the burst, as described above.

In one example, the electronic signal burst includes a data burst in a memory operation (e.g. a write burst, read burst, etc.) In one example, the die 110 includes a memory die such as a dynamic random access memory (DRAM) die, and the electronic components 150 being powered include memory cells in a memory array. In one memory device example, the circuit 140 is activated before a first bit in a data burst. The circuit 140 is then deactivated after the first bit, and the second pathway 130 returns to a high ESR state for the remainder of the data burst. Although switching the circuit 140 after the first bit is used as an example, the circuit 140 may be changed between the low ESR state and the high ESR state at another point in the data burst in other embodiments.

Although the device 100 in FIG. 1 is used as an example, the invention is not so limited. For example, in another embodiment, a first pathway is coupled between a first power supply and a second power supply, similar to FIG. 1. A second pathway is also coupled between a first power supply and a second power supply, the second pathway having a higher capacitance and a higher ESR than the first pathway.

In one example a third pathway is included, the third pathway having an ESR higher than the first pathway and lower than an ESR of the second pathway. In one example, the second pathway and the third pathway both have a capacitance that is higher than a capacitance in the first pathway. In one example, the capacitance in the second pathway and the third pathway is approximately the same. In one example, the capacitance in the second pathway and the third pathway is approximately four times higher than a capacitance in the first pathway.

In operation, a circuit is included to activate either the second pathway or the third pathway and enable either a low ESR state or a high ESR state, while maintaining the first pathway in parallel with either the second pathway or the third pathway. An effect of such operation is similar to the example described above. At a beginning of an electronic signal burst, the third pathway is activated, and reduces an ESR for a period of time at the beginning of the electronic signal burst. The reduction in ESR reduces or eliminates the unwanted dip in power. After the beginning of the electronic signal burst, the second pathway is activated. The high ESR state now provides a desired damping effect to reduce unwanted resonance for a remainder of the electronic signal burst.

Figure 2:
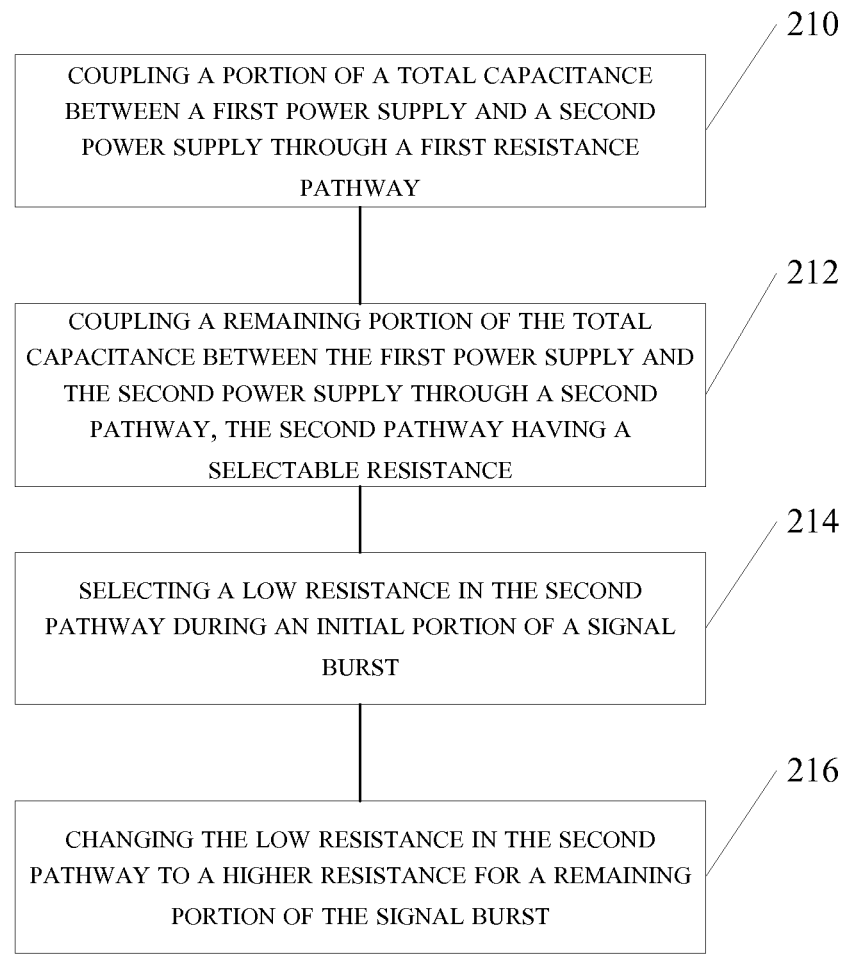
FIG. 2 shows a method of operating a device according to an embodiment of the invention.

FIG. 2 illustrates an example method of providing power to a memory device according to an embodiment of the invention. Operation 210 recites coupling a portion of a total capacitance between a first power supply and a second power supply through a first resistance pathway. One example of a first resistance pathway includes first pathway 120 from FIG. 1. Operation 212 recites coupling a remaining portion of the total capacitance between the first power supply and the second power supply through a second pathway, the second pathway having a selectable resistance. One example of a second resistance pathway includes second pathway 130 from FIG. 1. Although embodiments described in the present disclosure illustrate selecting one of two available resistance states, other embodiments may include selecting from a range of available resistance states that include a low ESR state and a high ESR state.

Operation 214 recites selecting a lower resistance state for the second pathway during an initial portion of a signal burst, and operation 216 recites changing the second pathway to a higher resistance state for a remaining portion of the signal burst. As discussed above, one example of a signal burst includes a data burst in a memory operation.

Figure 3:
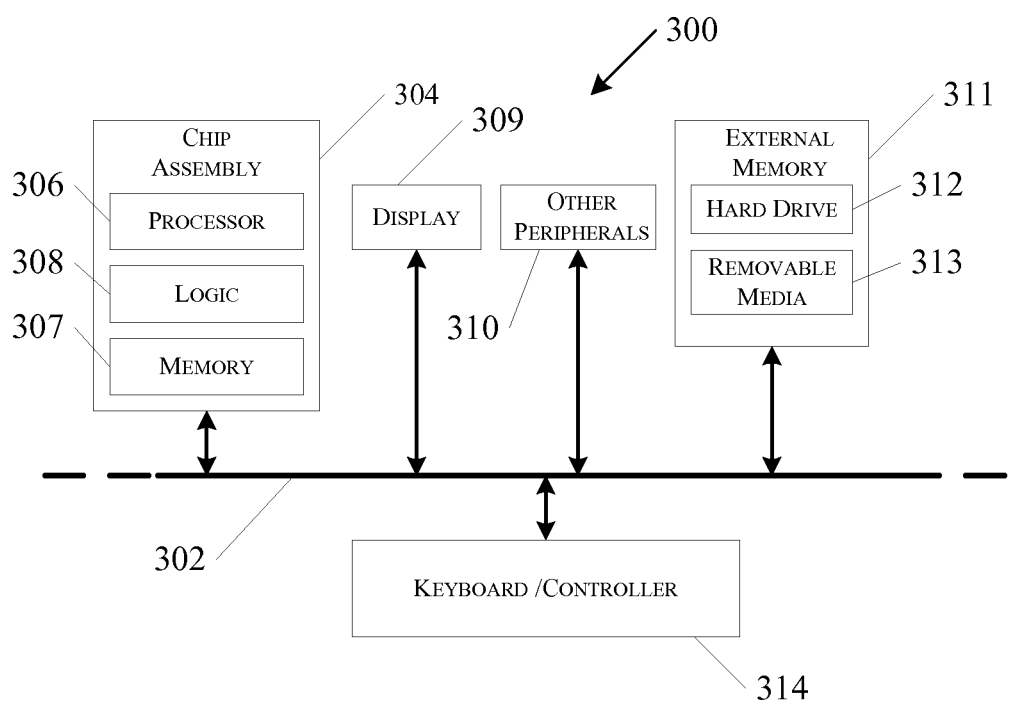
FIG. 3 shows an information handling system including a decoupling system according to an embodiment of the invention.

An embodiment of an information handling system such as a computer is included in FIG. 3 to show an embodiment of a high-level device application for the present invention. FIG. 3 is a block diagram of an information handling system 300 incorporating a decoupling power supply system according to embodiments of the invention as described above. Information handling system 300 is merely one embodiment of an electronic system in which decoupling systems of the present invention can be used. Other examples include, but are not limited to, netbooks, cameras, personal data assistants (PDAs), cellular telephones, MP3 players, aircraft, satellites, military vehicles, etc.

In this example, information handling system 300 comprises a data processing system that includes a system bus 302 to couple the various components of the system. System bus 302 provides communications links among the various components of the information handling system 300 and may be implemented as a single bus, as a combination of busses, or in any other suitable manner.

Chip assembly 304 is coupled to the system bus 302. Chip assembly 304 may include any circuit or operably compatible combination of circuits. In one embodiment, chip assembly 304 includes a processor 306 that can be of any type. As used herein, "processor" means any type of computational circuit such as, but not limited to, a microprocessor, a microcontroller, a graphics processor, a digital signal processor (DSP), or any other type of processor or processing circuit.

In one embodiment, a memory chip 307 is included in the chip assembly 304. In one embodiment, the memory chip 307 includes a decoupling power supply system as described in embodiments above.

In one embodiment, additional logic chips 308 other than processor chips are included in the chip assembly 304. An example of a logic chip 308 other than a processor includes an analog to digital converter. Other circuits on logic chips 308 such as custom circuits, an application-specific integrated circuit (ASIC), etc. are also included in one embodiment of the invention.

Information handling system 300 may also include an external memory 311, which in turn can include one or more memory elements suitable to the particular application, such as one or more hard drives 312, and/or one or more drives that handle removable media 313 such as compact disks (CDs), flash drives, digital video disks (DVDs), and the like. A semiconductor memory die constructed as described in examples above is included in the information handling system 300.

Information handling system 300 may also include a display device 309 such as a monitor, additional peripheral components 310, such as speakers, etc. and a keyboard and/or controller 314, which can include a mouse, trackball, game controller, voice-recognition device, or any other device that permits a system user to input information into and receive information from the information handling system 300.

While a number of embodiments of the invention are described, the above lists are not intended to be exhaustive. Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the present invention. It is to be understood that the above description is intended to be illustrative and not restrictive. Combinations of the above embodiments, and other embodiments, will be apparent to those of skill in the art upon studying the above description.

What is claimed is:

1. A device, comprising:
   a first pathway comprising a first effective series resistance and a first capacitance, coupled between a first power supply and a second power supply;
   a second pathway comprising a second effective series resistance and a second capacitance, the second pathway coupled in parallel to the first pathway between the first power supply and the second power supply, wherein the second effective series resistance is switchable between a higher resistance state and a lower resistance state;
   a circuit to switch the second effective series resistance to the lower resistance state during a portion of a signal, and to switch the second effective series resistance to the higher resistance state during another portion of the signal, wherein the circuit is configured to switch the second effective series resistance to the lower resistance state before a first digit in a burst of the signal, and is configured to switch the second effective series resistance to the higher resistance state after the first digit of the signal.

2. The device of claim 1, wherein the pathways are located on a semiconductor die.

3. The device of claim 1, wherein the portion is an initial portion and the other portion is a remaining portion.

4. The device of claim 1, wherein the portion is at the beginning of a burst of the signal.

5. The device of claim 1, wherein the circuit includes a passgate to switch the second effective series resistance to the lower resistance state and to switch the second effective series resistance to the higher resistance state.

6. The device of claim 5, wherein the passgate comprises an NMOS passgate.

7. The device of claim 4, wherein the signal is a data signal.

8. A device, comprising:
- a first pathway comprising a first effective series resistance and a first capacitance, coupled between a first power supply and a second power supply;
- a second pathway having a second effective series resistance higher than the first effective series resistance and a second capacitance higher than the first capacitance, the second pathway coupled in parallel with the first pathway between the first power supply and the second power supply;
- a third pathway comprising a third effective series resistance higher than the first effective series resistance and lower than the second effective series resistance and a third capacitance higher than the first capacitance, the third pathway coupled in parallel with the first pathway between the first power supply and the second power supply;
- a circuit to activate the third pathway during a portion of a signal, and to activate the second pathway during another portion of the signal, wherein the circuit is configured to switch the second effective series resistance to a lower resistance state at a beginning of a burst of the signal, and is configured to switch the second effective series resistance to a higher resistance state after the beginning of the burst of the signal.

9. The device of claim 8, wherein second capacitance and third capacitance are approximately the same.

10. The device of claim 9, wherein the second capacitance is approximately 4 times the first capacitance.

11. The device of claim 9, wherein the first pathway is located on a semiconductor die.

* * * * *